United States Patent
Jiang et al.

(10) Patent No.: US 10,466,449 B2
(45) Date of Patent: Nov. 5, 2019

(54) OPTICAL LENS

(71) Applicant: Young Optics Inc., Hsinchu Science Park (TW)

(72) Inventors: Sheng-Da Jiang, Hsinchu Science Park (TW); Yu-Hung Chou, Hsinchu Science Park (TW)

(73) Assignee: YOUNG OPTICS INC., Hsinchu (TW)

( * ) Notice: Subject to any disclaimer, the term of this patent is extended or adjusted under 35 U.S.C. 154(b) by 0 days.

(21) Appl. No.: 15/375,618

(22) Filed: Dec. 12, 2016

(65) Prior Publication Data
US 2017/0168271 A1    Jun. 15, 2017

(30) Foreign Application Priority Data
Dec. 15, 2015  (TW) .............................. 104142038 A

(51) Int. Cl.
| | | |
|---|---|---|
| G02B 13/04 | (2006.01) | |
| G02B 13/18 | (2006.01) | |
| G02B 27/00 | (2006.01) | |
| G02B 9/08 | (2006.01) | |
| G02B 9/10 | (2006.01) | |

(52) U.S. Cl.
CPC ............... *G02B 13/04* (2013.01); *G02B 9/08* (2013.01); *G02B 9/10* (2013.01); *G02B 13/18* (2013.01); *G02B 27/0025* (2013.01)

(58) Field of Classification Search
CPC .......... G02B 13/04; G02B 13/18; G02B 9/60; G02B 9/08; G02B 9/10; G02B 15/00; G02B 27/0025

USPC .......................................................... 359/708
See application file for complete search history.

(56) References Cited

U.S. PATENT DOCUMENTS

| | | | | |
|---|---|---|---|---|
| 4,830,474 A | * | 5/1989 | Nakayama | G02B 15/10 359/675 |
| 6,476,981 B1 | * | 11/2002 | Shikama | G02B 7/008 359/649 |
| 7,768,719 B2 | | 8/2010 | Jung et al. | |
| 7,933,078 B2 | | 4/2011 | Jung et al. | |
| 2006/0028741 A1 | * | 2/2006 | Kreitzer | G02B 13/16 359/793 |
| 2007/0053070 A1 | * | 3/2007 | Zeng | G02B 15/177 359/681 |
| 2015/0277086 A1 | * | 10/2015 | Yonezawa | G02B 13/004 359/715 |

FOREIGN PATENT DOCUMENTS

CN            103913818 A       7/2014

* cited by examiner

*Primary Examiner* — Evan P Dzierzynski
*Assistant Examiner* — Mitchell T Oestreich
(74) *Attorney, Agent, or Firm* — Muncy, Geissler, Olds & Lowe, P.C.

(57) ABSTRACT

An optical lens includes a first lens group with a negative refractive power, an aperture stop, and a second lens group with a positive refractive power. The first lens group includes a first aspheric lens and a second aspheric lens. The optical lens satisfies the conditions: 3.5>RT1>2.5 and 3.5>RT2>2.6, where RT1 is a ratio of a maximum axial thickness to a minimum axial thickness within a clear aperture of the first aspheric lens, and RT2 is a ratio of a maximum axial thickness to a minimum axial thickness within a clear aperture of the second aspheric lens.

19 Claims, 14 Drawing Sheets

OPTICAL LENS

BACKGROUND OF THE INVENTION a. Field of the Invention

The invention relates to an optical lens that provides a wide field-of-view and relatively low optical distortion.

b. Description of the Related Art

Conventional wide-angle lenses often impart optical distortion to the images. Particularly, as the viewing angle increases, optical distortions may rapidly increase and image edges are liable to be compressed to deteriorate image qualities. To solve this problem, an optical lens with a narrow field-of-view is often provided instead. However, it is desirable to provide an optical lens that may achieve a wide field-of-view, low optical distortions, low fabrication costs and good imaging qualities.

BRIEF SUMMARY OF THE INVENTION

According to one aspect of the present disclosure, an optical lens includes a first lens group with a negative refractive power, an aperture stop, and a second lens group with a positive refractive power. The first lens group includes a first aspheric lens and a second aspheric lens. The optical lens satisfies the conditions:

3.5>RT1>2.5;

3.5>RT2>2.6; and 0.77>f/H>0.6, where f is an effective focal length of the optical lens, H is a maximum image height of an image formed by the optical lens at the minified side, RT1 is a ratio of a maximum axial thickness to a minimum axial thickness within a clear aperture of the first aspheric lens, and RT2 is a ratio of a maximum axial thickness to a minimum axial thickness within a clear aperture of the second aspheric lens.

According to the above embodiment, the optical lens may achieve a wide field-of-view, low optical distortions, low fabrication costs and good imaging quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 3 is a transverse ray fan plot of the optical lens, FIG. 4 illustrates field curvature curves, and FIG. 5 illustrates a percentage distortion curve.

FIG. 7 is a transverse ray fan plot of the optical lens, FIG. 8 illustrates field curvature curves, and FIG. 9 illustrates a percentage distortion curve.

FIG. 11 is a transverse ray fan plot of the optical lens, FIG. 12 illustrates field curvature curves, and FIG. 13 illustrates a percentage distortion curve.

FIG. 15 is a transverse ray fan plot of the optical lens, FIG. 16 illustrates field curvature curves, and FIG. 17 illustrates a percentage distortion curve.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
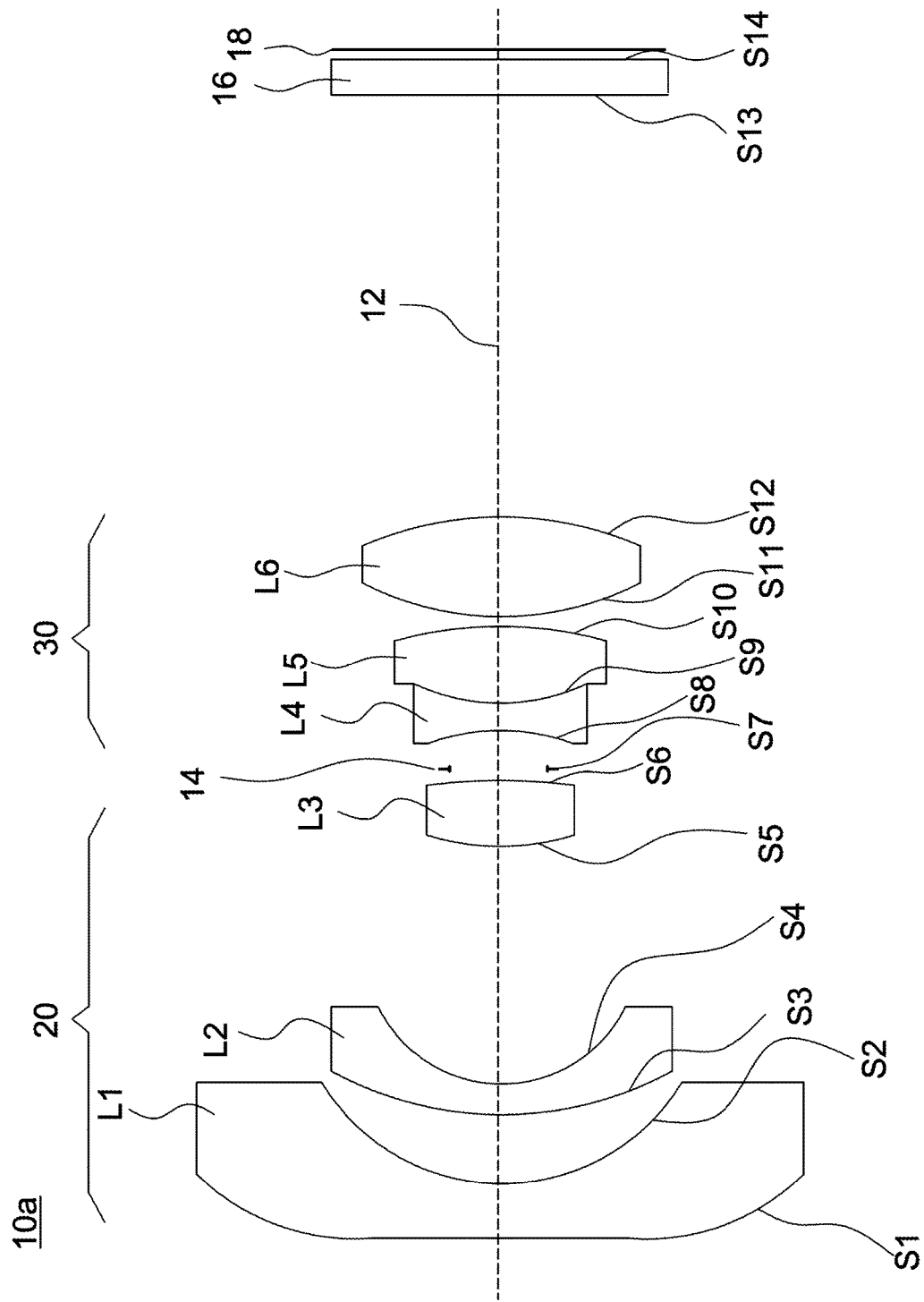
FIG. 1 shows a schematic cross-section of an optical lens according to an embodiment of the invention.

A first design example of an optical lens 10a is described in detail below with reference to FIG. 1. The optical lens 10a is disposed between a magnified side (on the left of FIG. 1; object side) to a minified side (on the right of FIG. 1; image side). As illustrated in FIG. 1, the optical lens 10a may include a first lens group 20 with a negative refractive power disposed between the magnified side and the minified side, a second lens group 30 with a positive refractive power disposed between the first lens group 20 and the minified side, and an aperture stop 14 disposed between the first lens group 20 and the second lens group 30. Further, the minified side may be disposed with a cover glass 16 and an image sensor (no shown in the figure) having an image plane 18, and The cover glass 16 is disposed between the second lens group 30 and the image plane 18. The first lens group 20 may include a first lens L1, a second lens L2 and a third lens L3 arranged in order from the magnified side to the minified side. The second lens group 30 may include a fourth lens L4, a fifth lens L5 and a sixth lens L6 arranged in order from the magnified side to the minified side. The refractive powers of the first lens L1 to the sixth lens L6 are negative, negative, positive, negative, positive and positive. In this embodiment, each of the first lens L1, the second lens L2 and the sixth lens L6 is an aspheric lens, the second lens L2 is a meniscus lens, and the fourth lens L4 is a bi-concave lens. The detailed optical data of the optical lens 10a such as lens parameters, shape and aspheric coefficients are shown in Tables 1-2 below, where the refractive index is "nd" and the Abbe number is "vd." In the following design examples, the aspheric surface satisfies the following equation:

$$Z = \frac{cr^2}{1+\sqrt{1-(1+k)c^2r^2}} + Ar^4 + Br^6 + Cr^8 + Dr^{10} + Er^{12} + Fr^{14} + \ldots,$$

where Z denotes a sag of an aspheric surface along the optical axis 12, c denotes a reciprocal of a radius of an osculating sphere, k denotes a Conic constant, and r denotes a height of the aspheric surface measured in a direction perpendicular to the optical axis 12. The conic constant k in all the following design examples is equal to zero. Parameters A-D shown in Table 2 are 4th, 6th, 8th and 10th order aspheric coefficients.

TABLE 1

| Object description | Surface number | Surface type | Radius (mm) | Interval (mm) | ND | VD |
|---|---|---|---|---|---|---|
| L1 | S1 | aspheric | ∞ | 1.42 | 1.53 | 55.8 |
| — | S2 | aspheric | 4.58 | 1.72 | — | — |
| L2 | S3 | aspheric | 7.23 | 0.70 | 1.53 | 55.8 |
| — | S4 | aspheric | 3.28 | 5.95 | — | — |
| L3 | S5 | spherical | 7.49 | 1.68 | 1.85 | 23.8 |
| — | S6 | spherical | −9.88 | 0.21 | — | — |
| Stop | S7 | spherical | ∞ | 1.05 | — | — |
| L4 | S8 | spherical | −5.99 | 0.70 | 1.92 | 18.9 |
| L5 | S9 | spherical | 4.74 | 1.86 | 1.71 | 53.9 |
| — | S10 | spherical | −9.27 | 0.20 | — | — |
| L6 | S11 | aspheric | 6.48 | 2.54 | 1.53 | 55.8 |
| — | S12 | aspheric | −5.57 | 4.50 | — | — |
| Cover glass | S13 | planar | ∞ | 0.45 | 1.52 | 64.2 |
| — | S14 | planar | ∞ | 0.01 | — | — |

TABLE 2

|   | S1 | S2 | S3 | S4 | S11 | S12 |
|---|---|---|---|---|---|---|
| A | 9.23E−05 | −3.29E−03 | 4.78E−03 | 8.93E−03 | −1.39E−03 | 2.82E−03 |
| B | 2.10E−05 | 8.06E−06 | −7.22E−04 | −1.74E−04 | 9.64E−05 | −5.44E−05 |
| C | −4.08E−07 | 7.74E−06 | 2.97E−05 | −1.42E−04 | −1.33E−06 | 1.24E−05 |
| D | 3.41E−09 | −2.51E−07 | −4.04E−07 | 8.15E−06 | −9.20E−08 | −5.25E−07 |

Figure 2:
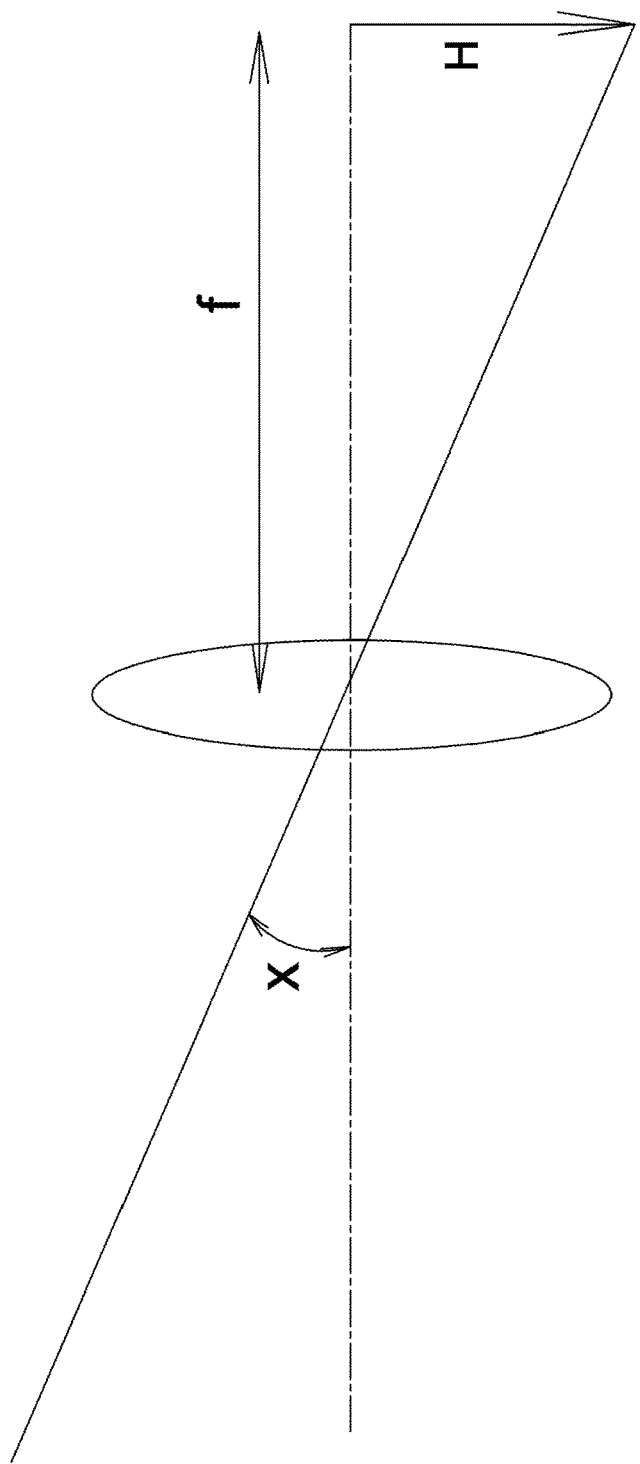
FIG. 2 shows a schematic diagram for illustrating some optical parameters for different embodiments of the invention.
Figure 18:
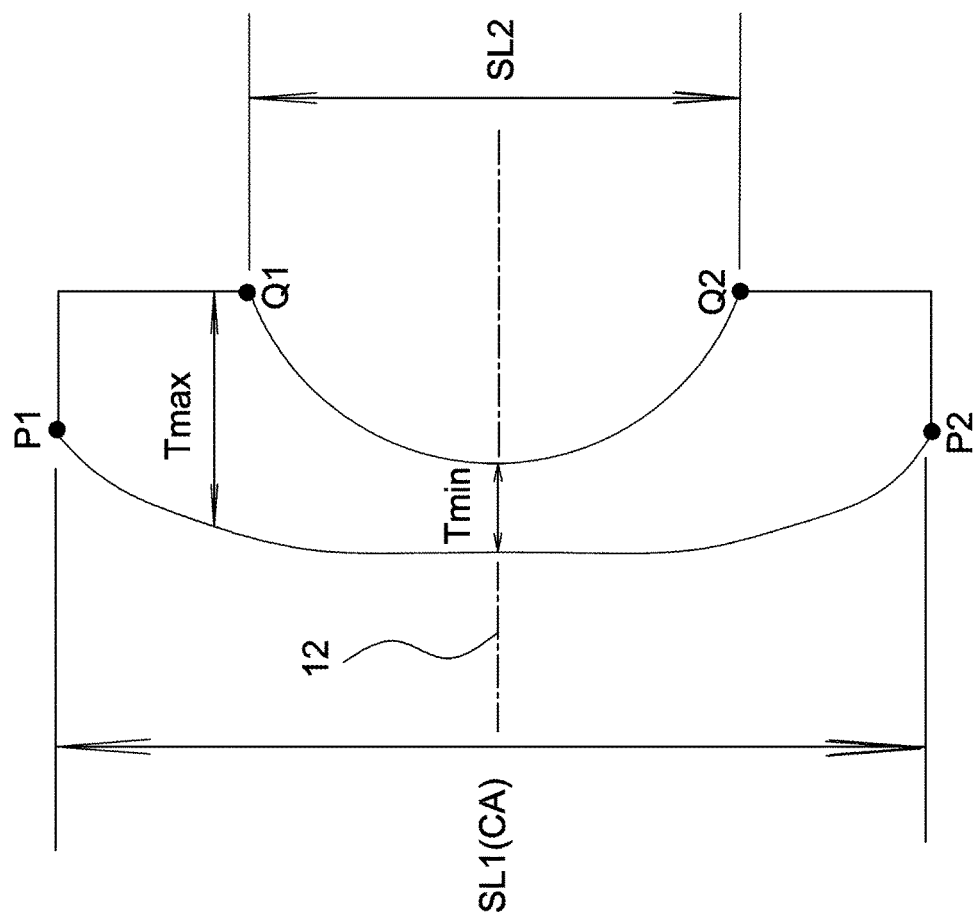
FIG. 18 shows another schematic diagram for illustrating some optical parameters for different embodiments of the invention.

Further, as shown in FIG. 2, "x" denotes a maximum half field angle of the optical lens, "f" denotes an effective focal length of the optical lens, and "H" denotes a maximum image height of an image formed by the optical lens at the minified side, and "TTL" denotes a distance between a magnified-side surface S1 of the first lens L1 and the image plane 18 along the optical axis 12. Therefore, a value of H/(f*tan(x))−1 that corresponds to the distortion degree of the optical lens 10a can be estimated. Further, as shown in FIG. 18, an aspheric lens has a left-side lens surface and a right-side lens surface, a vertical length SL1 is measured between two opposite points P1 and P2 of discontinuity of the left-side lens surface on the top and bottom surfaces (planar or curved surface) relative to the optical axis 12, a vertical length SL2 is measured between two opposite points Q1 and Q2 of discontinuity of the right-side lens surface on the top and bottom surfaces (planar or curved surface) relative to the optical axis 12, and a maximum value among the vertical length SL1 and the vertical length SL2 is defined as a clear aperture CA of the aspheric lens. Besides, another parameter RT is defined as a ratio of a maximum axial thickness Tmax to a minimum axial thickness Tmin within the clear aperture CA of the aspheric lens shown in FIG. 18.

Table 3 lists lens parameters and an estimation of H/(f*tan(x))−1 (reflecting the degree of optical distortion) of the optical lens 10a described above.

TABLE 3

| x/TTL | 2.46 |
|---|---|
| CA/f | 5.92 |
| f/H | 0.75 |
| H/(f * tan(x)) − 1 | −0.1186 |

Figure 3:
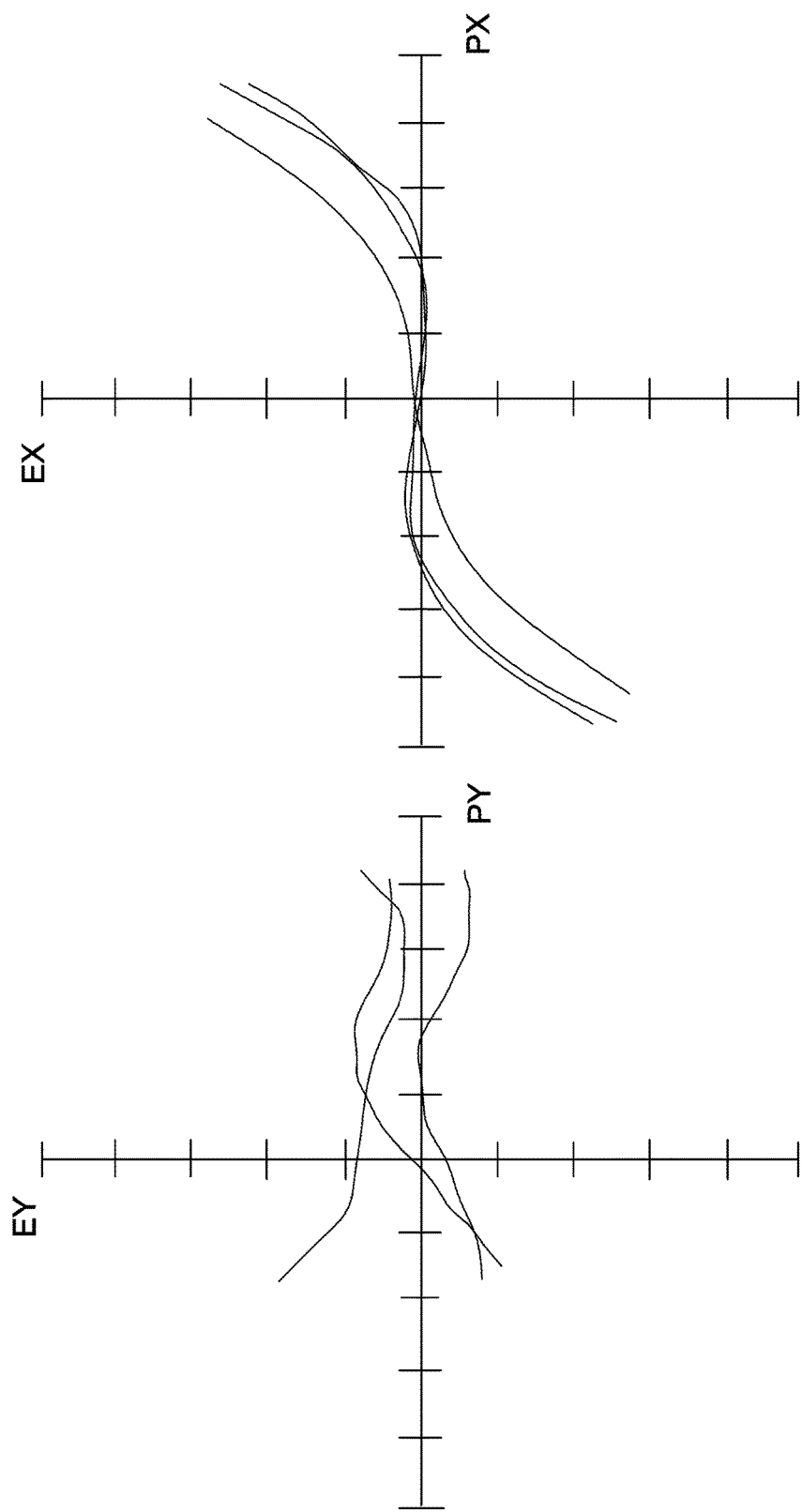
FIGS. 3-5 show optical simulation results of the optical lens shown in FIG. 1.
Figure 5:
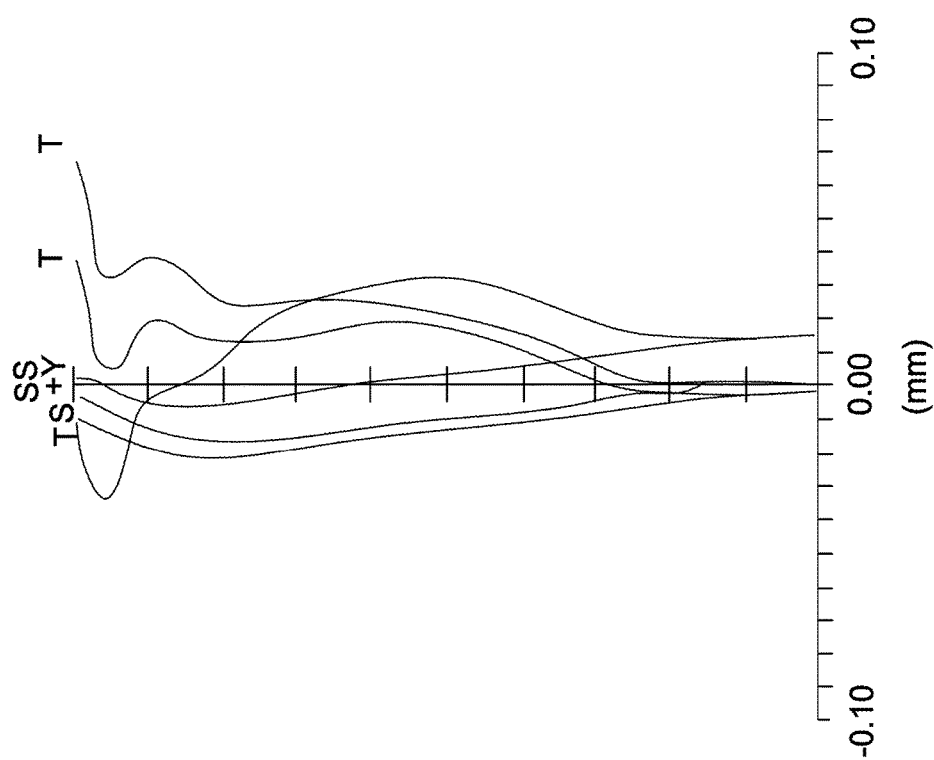
Figure 4:
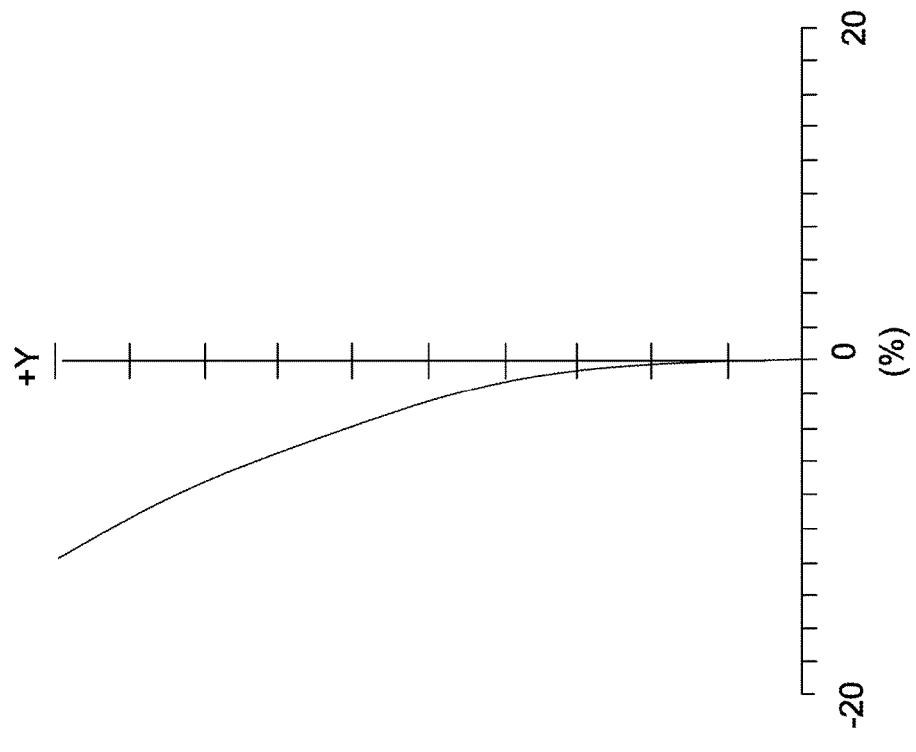

FIGS. 3-5 show optical simulation results of the optical lens 10a shown in FIG. 1. FIG. 3 is a transverse ray fan plot of the optical lens 10a, FIG. 4 illustrates field curvature curves, and FIG. 5 illustrates a percentage distortion curve, where it shows that a maximum optical distortion is −11.7%. The simulated results shown in FIGS. 2-5 are within permitted ranges specified by the standard, which indicates the optical lens 10a according to the above embodiment may achieve good imaging quality and a wide field-of-view.

Figure 6:
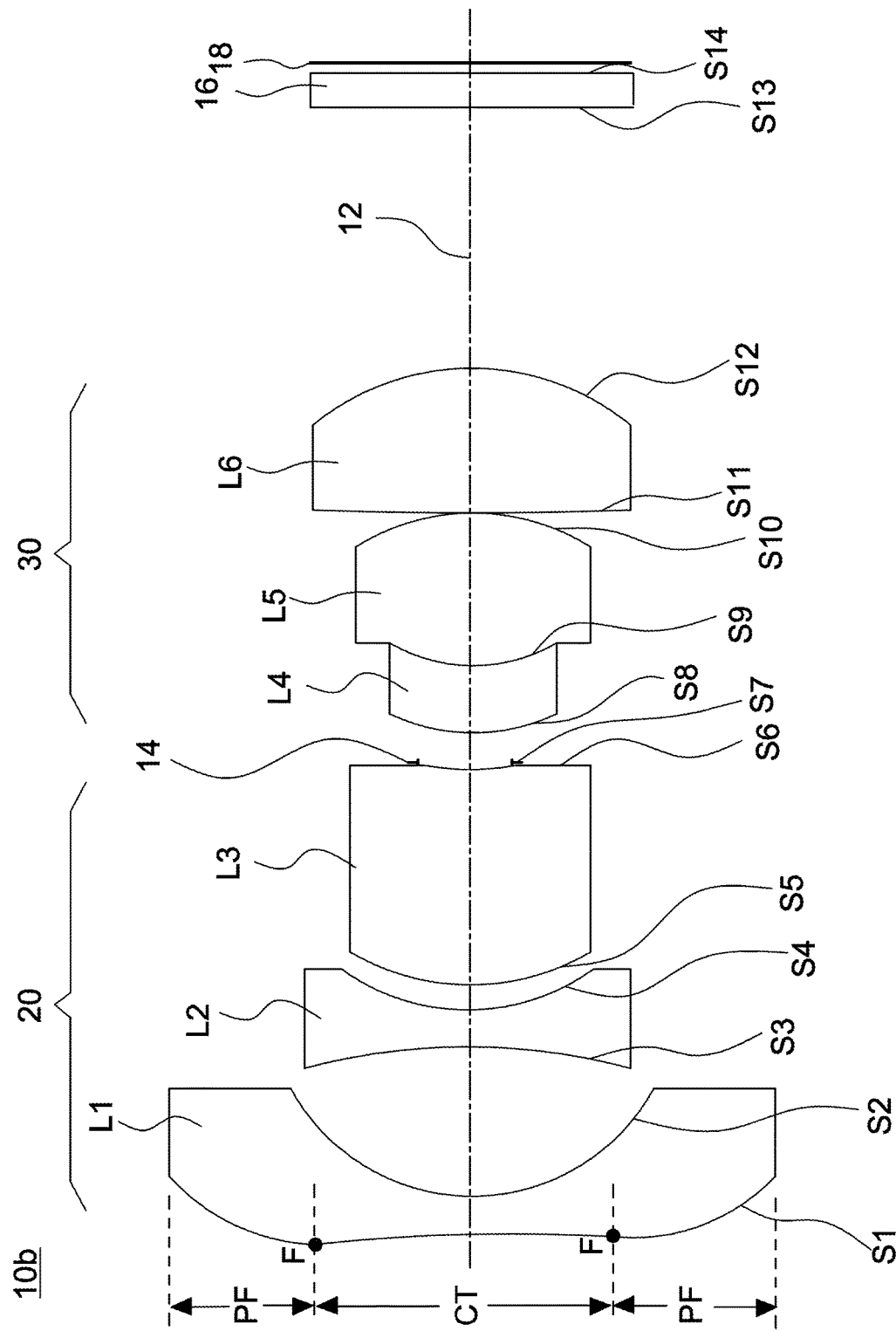
FIG. 6 shows a schematic cross-section of an optical lens according to another embodiment of the invention.

In an alternate embodiment shown in FIG. 6, an optical lens 10b is different to the optical lens 10a of FIG. 1 as having a bi-concave second lens L2 and a meniscus fourth lens L4. Further, as shown in FIG. 6, a magnified-side surface of the first lens L1 may include a center region CT overlapping the axis 12 and an a periphery region PF away from the axis 12, and the center region CT is concave toward the magnified side to form at least one inflection point F on the border between the center region CT and the periphery region PF. The detailed optical data of the optical lens 10b such as lens parameters, shape and aspheric coefficients are shown in Tables 4-5 below. Parameters A-F shown in Table 5 are 4th, 6th, 8th, 10th, 12th and 14th order aspheric coefficients.

TABLE 4

| Object description | Surface number | Surface type | Radius (mm) | Interval (mm) | ND | VD |
|---|---|---|---|---|---|---|
| L1 | S1 | aspheric | −19.83 | 0.85 | 1.53 | 56.3 |
| — | S2 | aspheric | 3.76 | 2.97 | — | — |
| L2 | S3 | aspheric | −6.10 | 0.70 | 1.53 | 56.3 |
| — | S4 | aspheric | 7.59 | 0.56 | — | — |

TABLE 4-continued

| Object description | Surface number | Surface type | Radius (mm) | Interval (mm) | ND | VD |
|---|---|---|---|---|---|---|
| L3 | S5 | spherical | 5.61 | 4.30 | 1.92 | 18.9 |
| — | S6 | spherical | 15.56 | 0.15 | — | — |
| Stop | S7 | spherical | ∞ | 0.50 | — | — |
| L4 | S8 | spherical | 5.85 | 1.31 | 1.92 | 18.9 |
| L5 | S9 | spherical | 3.10 | 2.88 | 1.5 | 81.5 |
| — | S10 | spherical | −5.64 | 0.10 | — | — |
| L6 | S11 | aspheric | 15.53 | 2.96 | 1.53 | 56.3 |
| — | S12 | aspheric | −4.31 | 5.00 | — | — |
| Cover glass | S13 | planar | ∞ | 0.71 | 1.52 | 64.2 |
| — | S14 | planar | ∞ | 0.01 | — | — |

TABLE 5

|   | S1 | S2 | S3 | S4 | S11 | S12 |
|---|---|---|---|---|---|---|
| A | 3.73E−03 | −2.57E−03 | 6.56E−03 | 1.47E−02 | −2.14E−03 | 1.41E−03 |
| B | −1.48E−04 | 4.39E−04 | −4.84E−04 | −1.37E−03 | 3.99E−05 | −9.27E−05 |
| C | 3.64E−06 | −4.89E−05 | 1.78E−05 | 3.06E−04 | −9.31E−06 | 1.44E−05 |
| D | −1.25E−08 | −1.64E−08 | −8.21E−09 | −4.26E−05 | 3.92E−07 | −1.61E−06 |
| E | −1.30E−09 | 2.36E−07 | −3.95E−09 | 2.57E−06 | 4.50E−08 | 7.52E−08 |
| F | 2.16E−11 | −1.29E−08 | 0.00E+00 | 0.00E+00 | 0.00E+00 | 0.00E+00 |

Further, Table 6 lists lens parameters and an estimation of H/(f*tan(x))−1 (reflecting the degree of optical distortion) of the optical lens 10b described above.

TABLE 6

| x/TTL | 2.44 |
|---|---|
| CA/f | 4.88 |
| f/H | 0.76 |
| H/(f * tan(x)) − 1 | −0.1181 |

Figure 7:
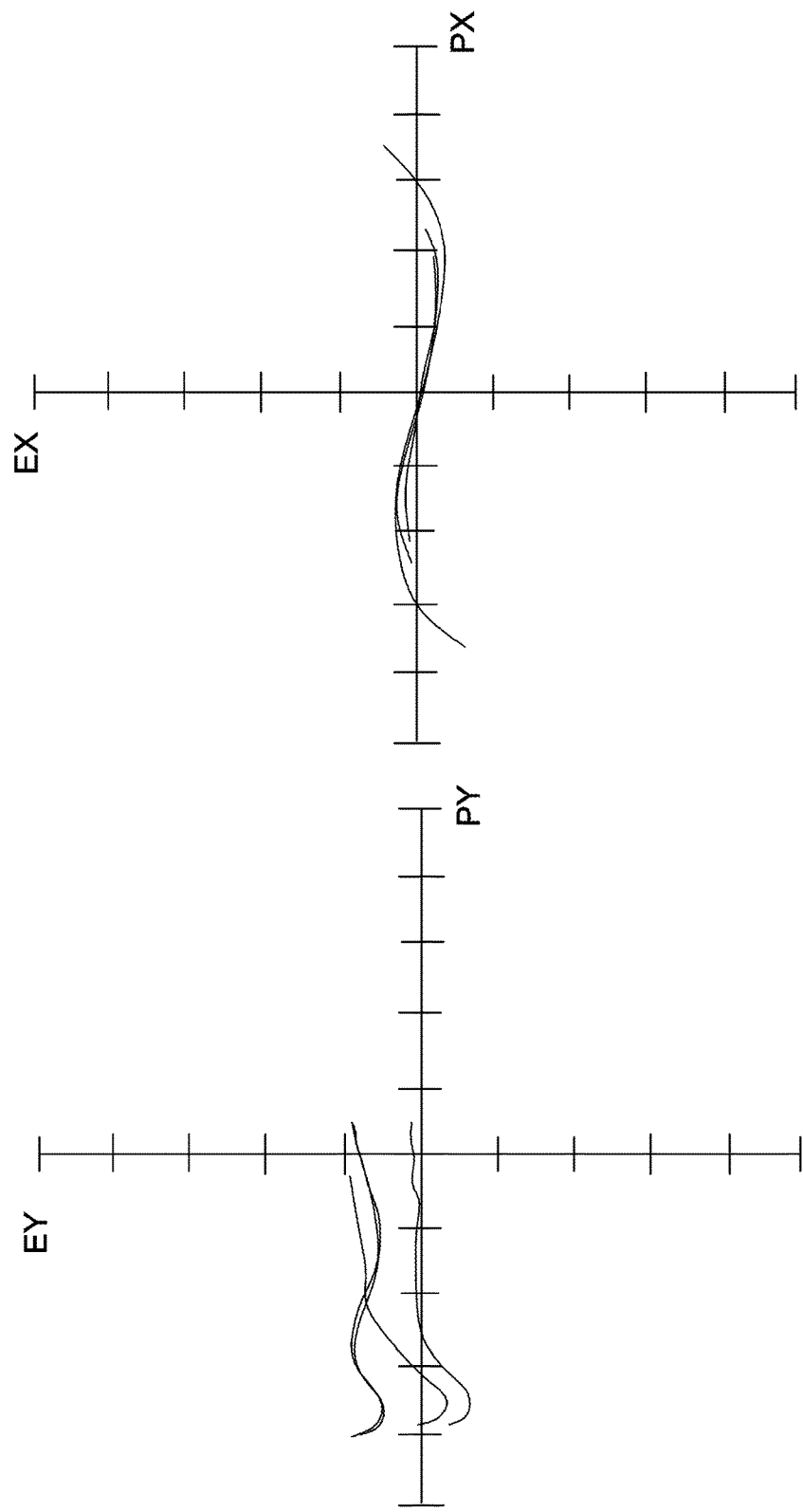
FIGS. 7-9 show optical simulation results of the optical lens shown in FIG. 6.
Figure 8:
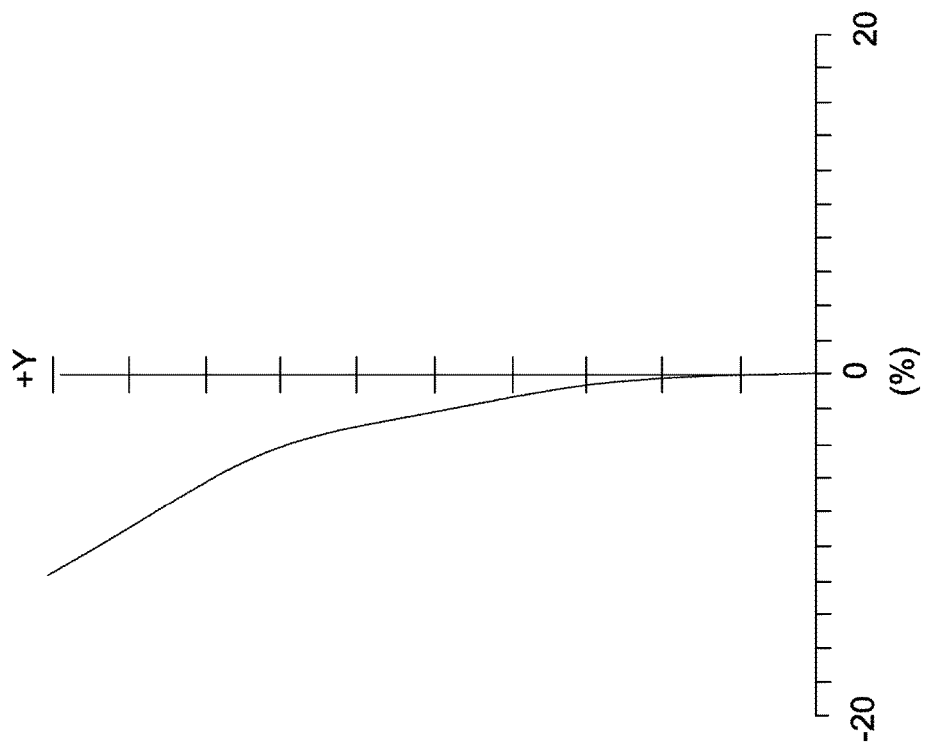
Figure 9:
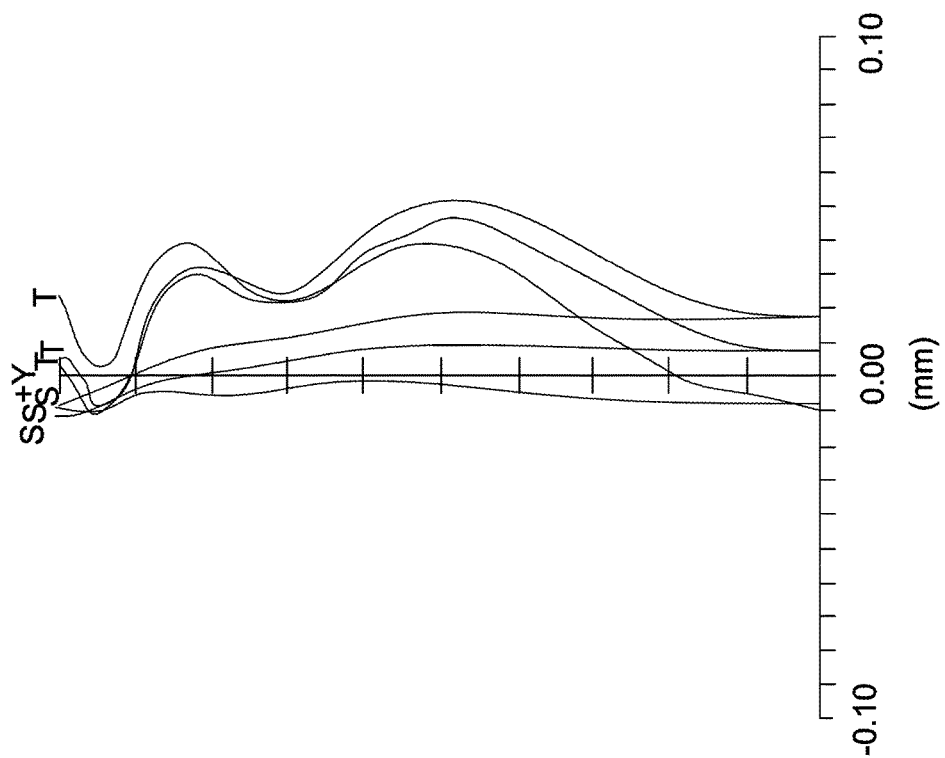

FIGS. 7-9 show optical simulation results of the optical lens 10b shown in FIG. 6. FIG. 7 is a transverse ray fan plot of the optical lens 10b, FIG. 8 illustrates field curvature curves, and FIG. 9 illustrates a percentage distortion curve, where it shows that a maximum optical distortion is −11.9%. The simulated results shown in FIGS. 7-9 are within permitted ranges specified by the standard, which indicates the optical lens 10b according to the above embodiment may achieve good imaging quality and a wide field-of-view.

Figure 10:
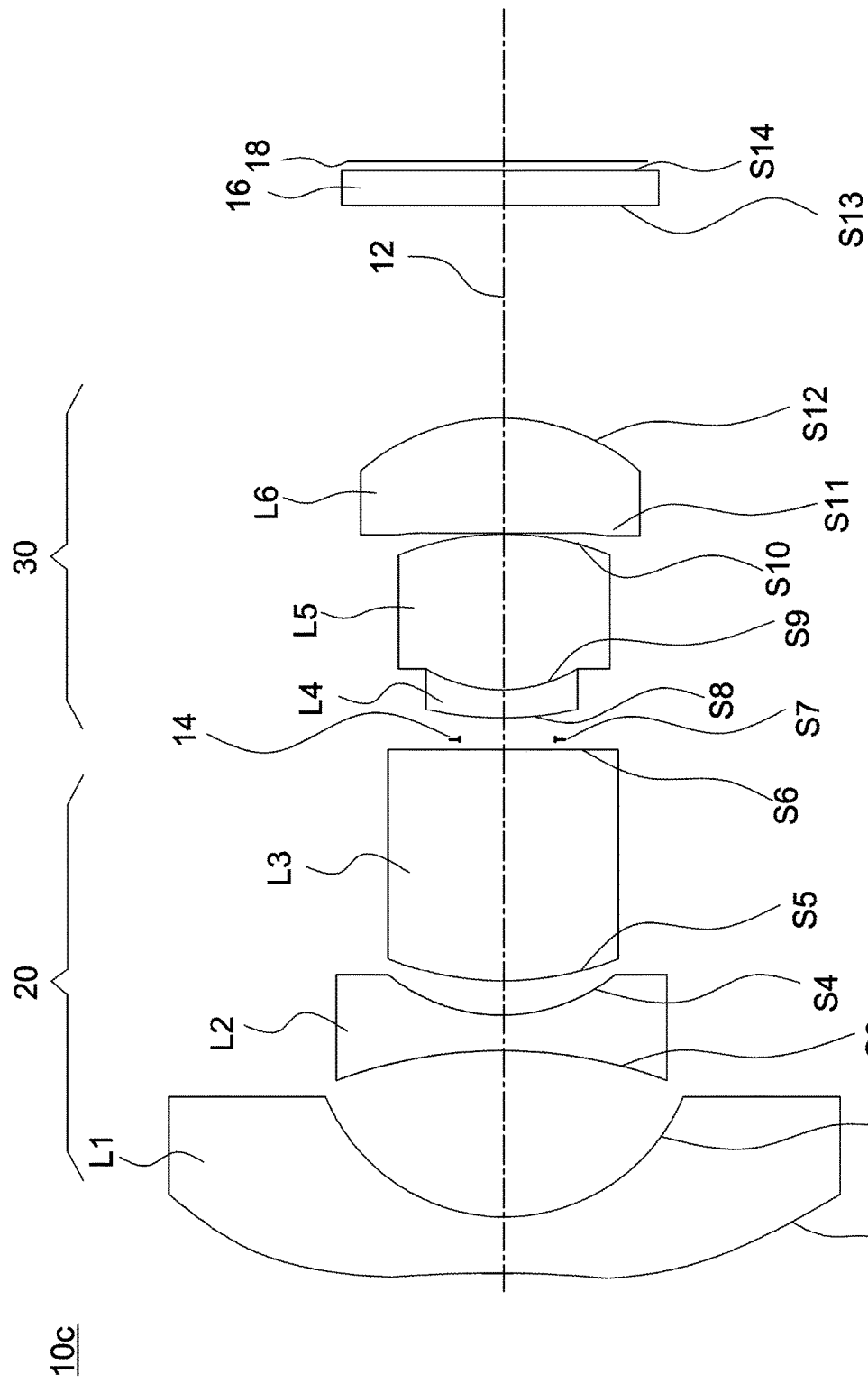
FIG. 10 shows a schematic cross-section of an optical lens according to another embodiment of the invention.

In an alternate embodiment shown in FIG. 10, an optical lens 10c is different to the optical lens 10a of FIG. 1 as having a bi-concave second lens L2 and a meniscus fourth lens L4. The detailed optical data of the optical lens 10c such as lens parameters, shape and aspheric coefficients are shown in Tables 7-8 below. Parameters A-F shown in Table 8 are 4th, 6th, 8th, 10th, 12th and 14th order aspheric coefficients.

TABLE 7

| Object description | Surface number | Surface type | Radius (mm) | Interval (mm) | ND | VD |
|---|---|---|---|---|---|---|
| L1 | S1 | aspheric | −15.82 | 1.20 | 1.53 | 55.80 |
| — | S2 | aspheric | 4.06 | 3.46 | — | — |
| L2 | S3 | aspheric | −5.72 | 0.83 | 1.53 | 55.80 |
| — | S4 | aspheric | 7.58 | 0.68 | — | — |
| L3 | S5 | spherical | 6.79 | 4.90 | 1.95 | 17.90 |
| — | S6 | spherical | ∞ | 0.22 | — | — |
| Stop | S7 | spherical | ∞ | 0.49 | — | — |
| L4 | S8 | spherical | 5.68 | 0.65 | 1.95 | 17.90 |
| L5 | S9 | spherical | 3.10 | 3.43 | 1.50 | 81.50 |
| — | S10 | spherical | −4.88 | 0.10 | — | — |
| L6 | S11 | aspheric | ∞ | 2.31 | 1.53 | 55.80 |

TABLE 7-continued

| Object description | Surface number | Surface type | Radius (mm) | Interval (mm) | ND | VD |
|---|---|---|---|---|---|---|
| — | S12 | aspheric | −4.43 | 4.50 | — | — |
| Cover glass | S13 | planar | ∞ | 0.71 | 1.52 | 64.2 |
| — | S14 | planar | ∞ | 0.03 | — | — |

TABLE 8

|   | S1 | S2 | S3 | S4 | S11 | S12 |
|---|---|---|---|---|---|---|
| A | 4.15E−03 | −9.85E−04 | 6.78E−03 | 1.30E−02 | −4.31E−03 | −2.46E−04 |
| B | −1.64E−04 | 7.18E−04 | −4.68E−04 | −1.28E−03 | 3.31E−05 | 1.60E−05 |
| C | 4.32E−06 | −8.60E−05 | 2.39E−05 | 2.99E−04 | −5.59E−05 | −3.06E−05 |
| D | −6.62E−08 | 3.92E−06 | −5.41E−07 | −3.57E−05 | 5.02E−06 | 2.96E−06 |
| E | 5.07E−10 | −9.23E−08 | 2.95E−09 | 1.70E−06 | −2.52E−07 | −1.49E−07 |
| F | −9.89E−13 | −1.37E−10 | 0.00E+00 | 0.00E+00 | 0.00E+00 | 0.00E+00 |

Further, Table 9 lists lens parameters and an estimation of H/(f*tan(x))−1 (reflecting the degree of optical distortion) of the optical lens 10c described above.

TABLE 9

| x/TTL | 2.61 |
|---|---|
| CA/f | 6.72 |
| f/H | 0.63 |
| H/(f * tan(x)) − 1 | −0.1308 |

Figure 11:
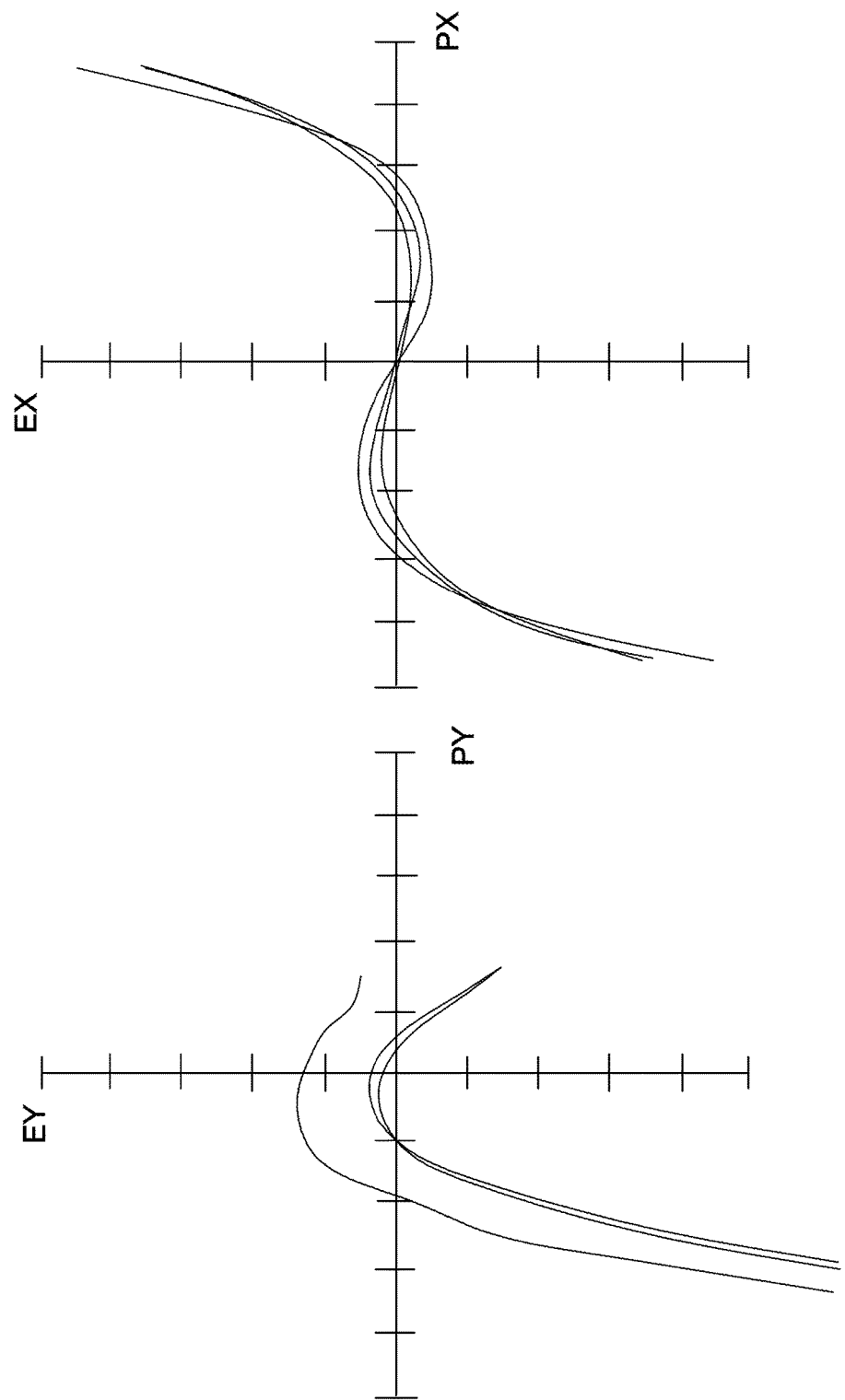
FIGS. 11-13 show optical simulation results of the optical lens shown in FIG. 10.
Figures 12, 13:
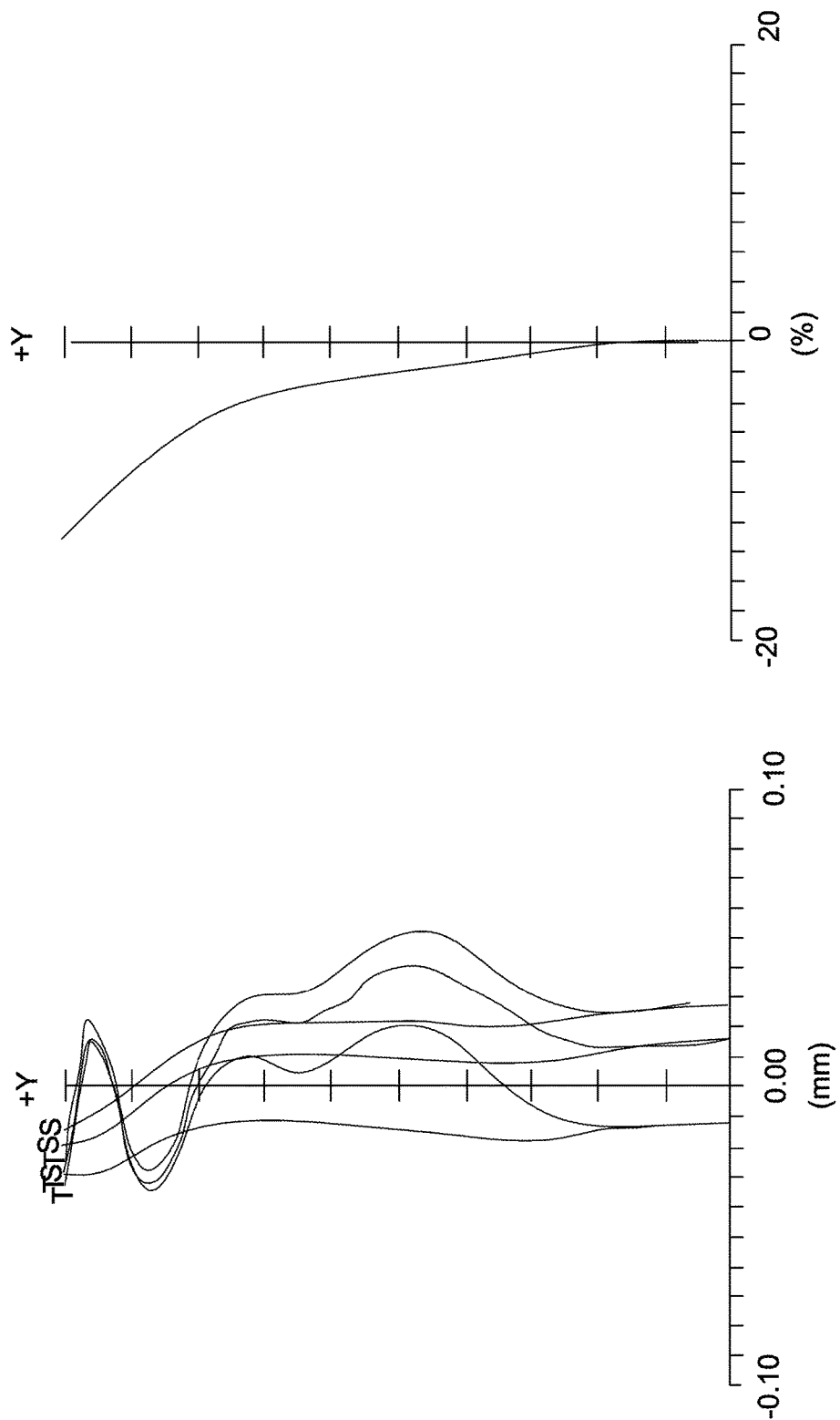

FIGS. 11-13 show optical simulation results of the optical lens 10c shown in FIG. 10. FIG. 11 is a transverse ray fan plot of the optical lens 10c, FIG. 12 illustrates field curvature curves, and FIG. 13 illustrates a percentage distortion curve, where it shows that a maximum optical distortion is −13.2%. The simulated results shown in FIGS. 11-13 are within permitted ranges specified by the standard, which indicates the optical lens 10c according to the above embodiment may achieve good imaging quality and a wide field-of-view.

Figure 14:
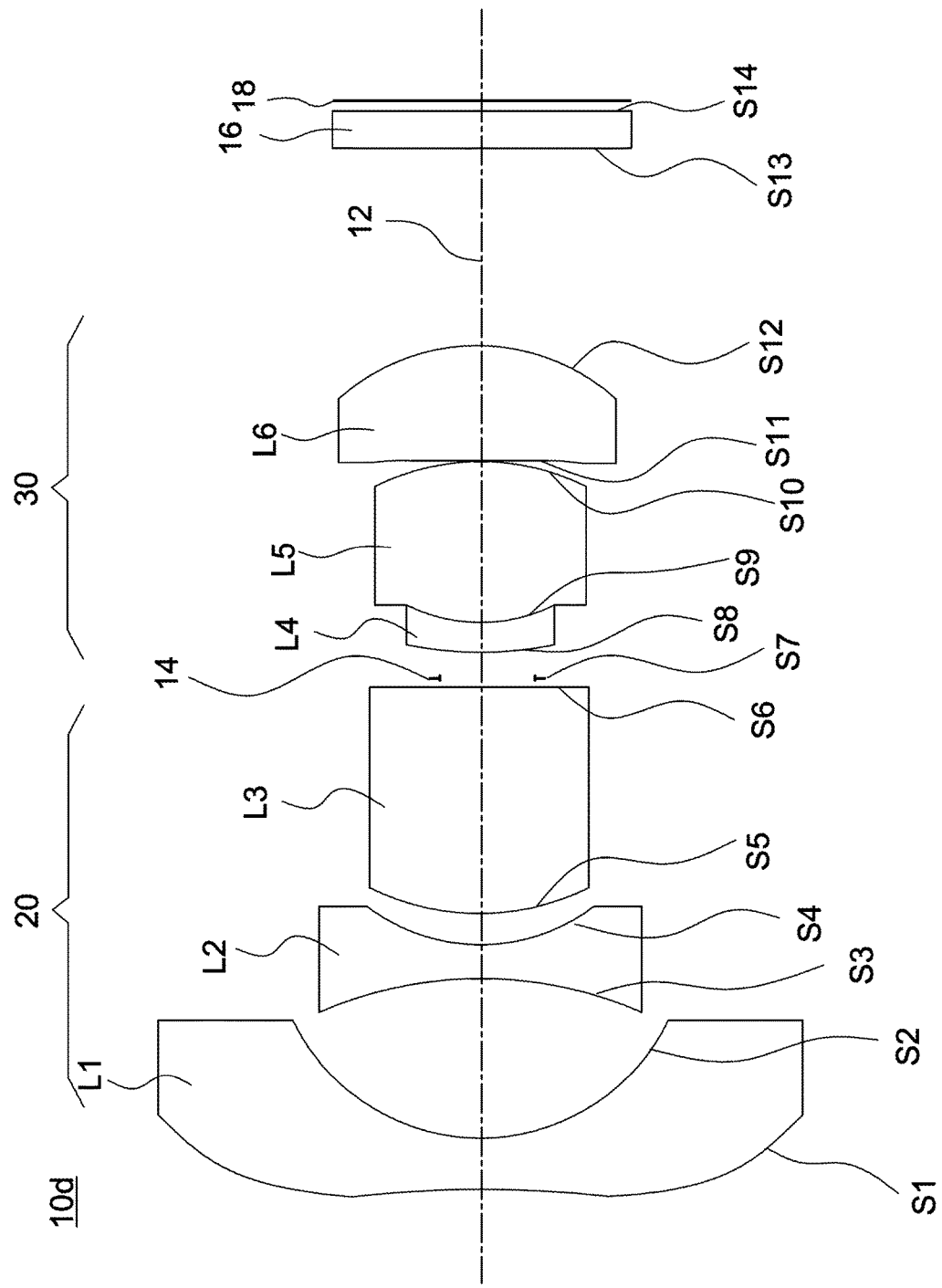
FIG. 14 shows a schematic cross-section of an optical lens according to another embodiment of the invention.

In an alternate embodiment shown in FIG. 14, an optical lens 10d is different to the optical lens 10a of FIG. 1 as having a bi-concave second lens L2 and a meniscus fourth lens L4. The detailed optical data of the optical lens 10d such as lens parameters, shape and aspheric coefficients are shown in Tables 10-11 below. Parameters A-F shown in Table 11 are 4th, 6th, 8th, 10th, 12th and 14th order aspheric coefficients.

TABLE 10

| Object description | Surface number | Surface type | Radius (mm) | Interval (mm) | ND | VD |
|---|---|---|---|---|---|---|
| L1 | S1 | aspheric | −15.80 | 1.19 | 1.53 | 55.80 |
| — | S2 | aspheric | 4.06 | 3.46 | — | — |
| L2 | S3 | aspheric | −5.73 | 0.83 | 1.53 | 55.80 |
| — | S4 | aspheric | 7.58 | 0.68 | — | — |
| L3 | S5 | spherical | 6.79 | 4.89 | 1.95 | 17.90 |
| — | S6 | spherical | ∞ | 0.21 | — | — |
| Stop | S7 | spherical | ∞ | 0.03 | — | — |
| L4 | S8 | spherical | 5.68 | 0.65 | 1.95 | 17.90 |
| L5 | S9 | spherical | 3.10 | 3.47 | 1.50 | 81.50 |
| — | S10 | spherical | −4.88 | 0.10 | — | — |
| L6 | S11 | aspheric | ∞ | 2.31 | 1.53 | 55.80 |
| — | S12 | aspheric | −4.43 | 4.50 | — | — |
| Cover glass | S13 | planar | ∞ | 0.71 | 1.52 | 64.2 |
| — | S14 | planar | ∞ | 0.03 | — | — |

TABLE 11

|  | S1 | S2 | S3 | S4 | S11 | S12 |
|---|---|---|---|---|---|---|
| A | 4.15E−03 | −1.01E−03 | 6.79E−03 | 1.30E−02 | −4.32E−03 | −2.41E−04 |
| B | −1.64E−04 | 7.18E−04 | −4.67E−04 | −1.28E−03 | 3.32E−05 | 1.74E−05 |
| C | 4.32E−06 | −8.60E−05 | 2.39E−05 | 2.98E−04 | −5.58E−05 | −3.05E−05 |
| D | −6.62E−08 | 3.92E−06 | −5.43E−07 | −3.56E−05 | 5.08E−06 | 2.97E−06 |
| E | 5.07E−10 | −9.22E−08 | 2.46E−09 | 1.69E−06 | −2.43E−07 | −1.46E−07 |
| F | −9.94E−13 | −1.43E−10 | 0.00E+00 | 0.00E+00 | 0.00E+00 | 0.00E+00 |

Further, Table 12 lists lens parameters and an estimation of $H/(f*\tan(x))-1$ (reflecting the degree of optical distortion) of the optical lens 10d described above.

TABLE 12

| x/TTL | 2.56 |
|---|---|
| CA/f | 6.60 |
| f/H | 0.66 |
| $H/(f * \tan(x)) - 1$ | −0.1224 |

Figure 15:
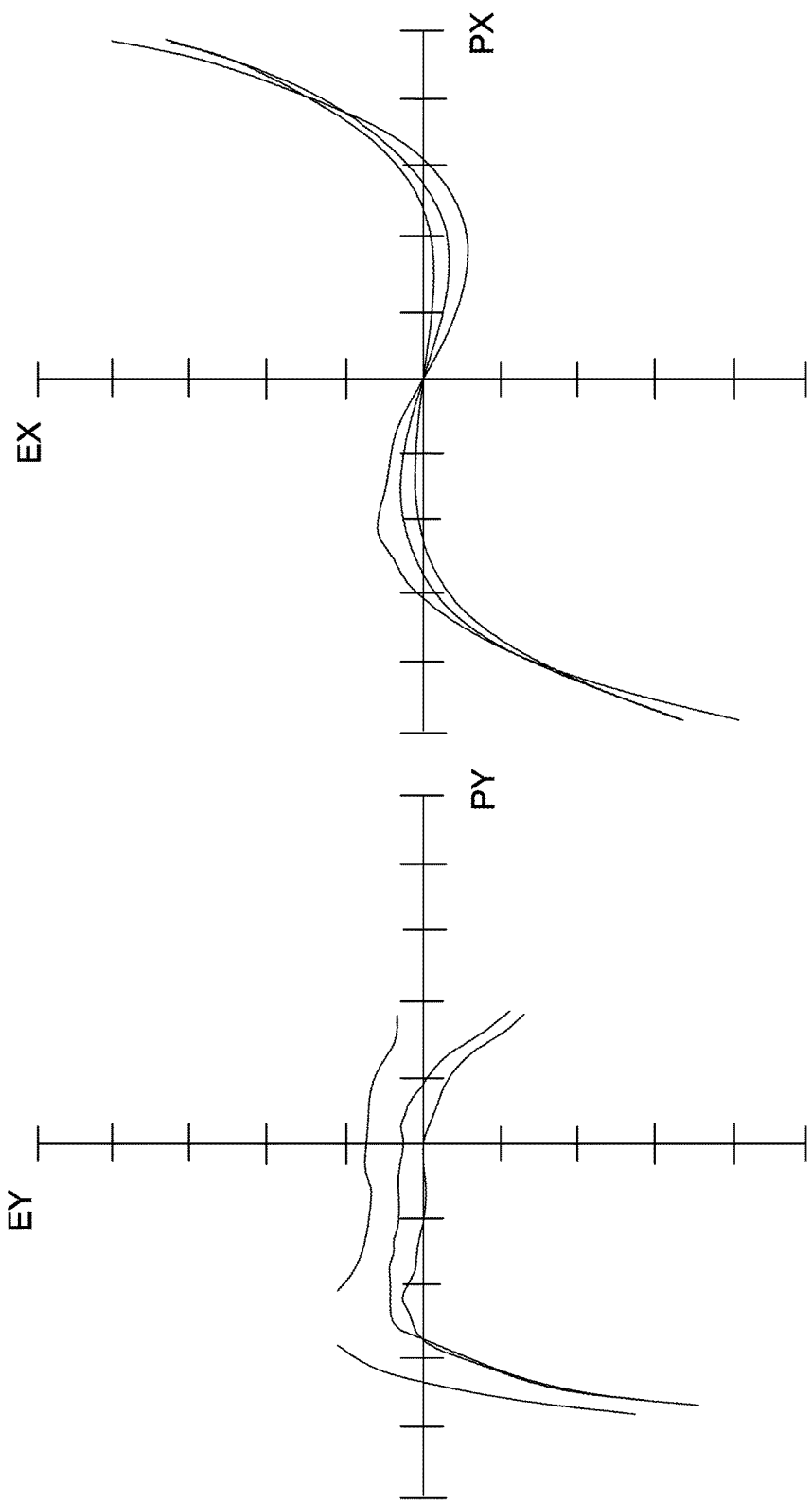
FIGS. 15-17 show optical simulation results of the optical lens shown in FIG. 14.
Figure 17:
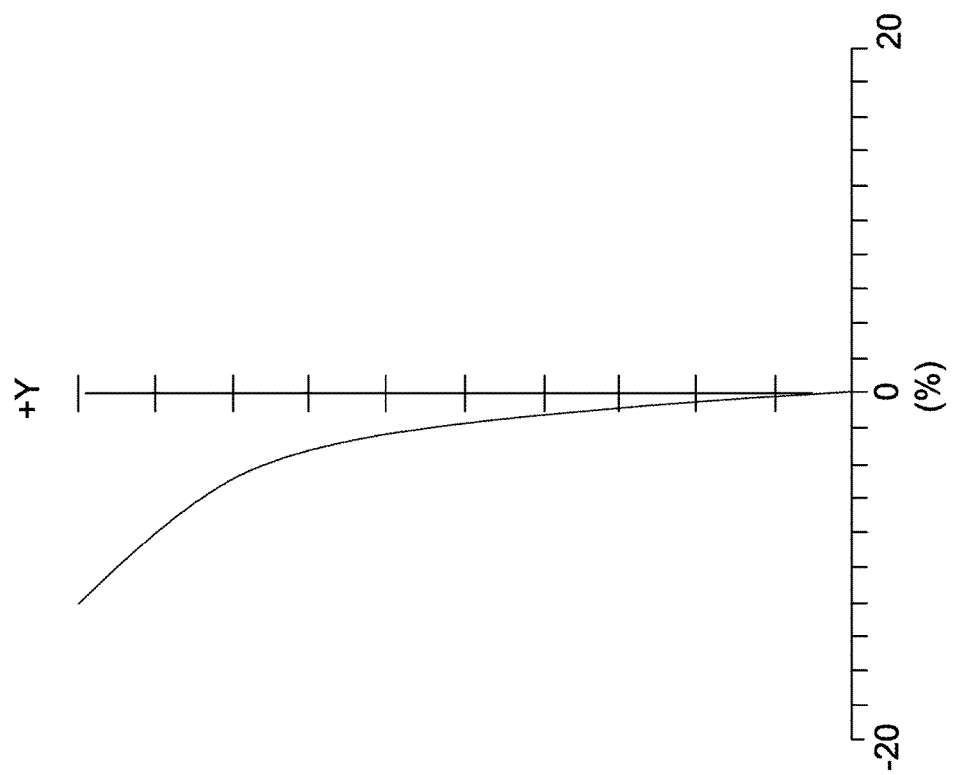
Figure 16:
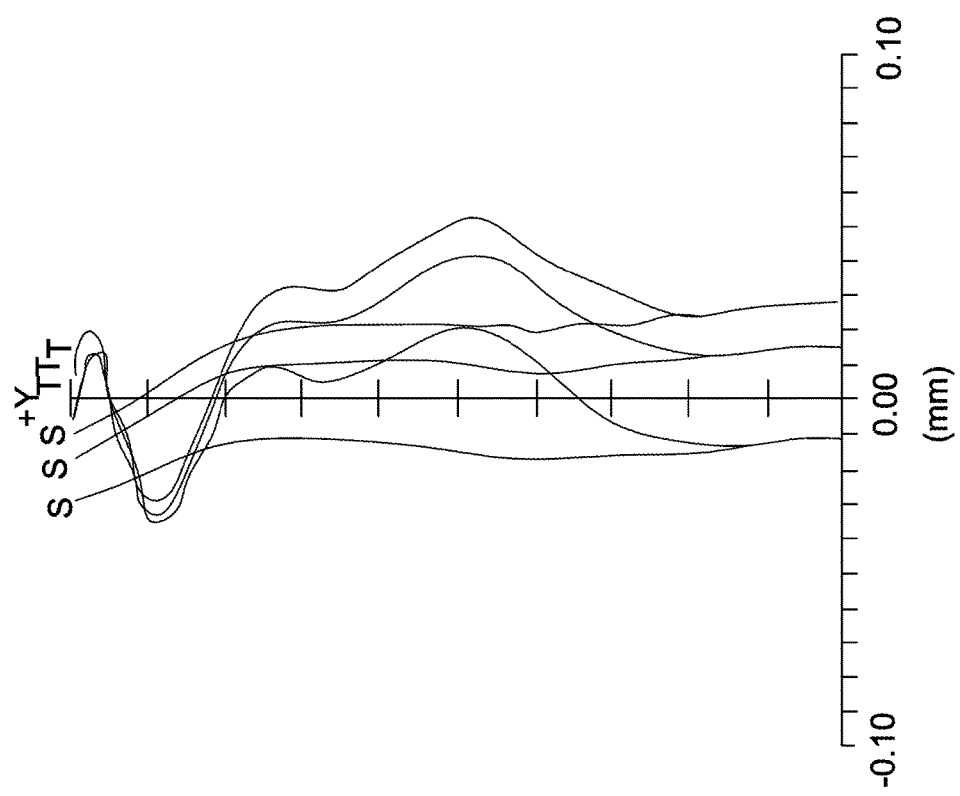

FIGS. 15-17 show optical simulation results of the optical lens 10d shown in FIG. 14. FIG. 15 is a transverse ray fan plot of the optical lens 10d, FIG. 16 illustrates field curvature curves, and FIG. 17 illustrates a percentage distortion curve, where it shows that a maximum optical distortion is −12.4%. The simulated results shown in FIGS. 15-17 are within permitted ranges specified by the standard, which indicates the optical lens 10d according to the above embodiment may achieve good imaging quality and a wide field-of-view.

An optical lens according to the above embodiments of the invention may include two lens groups and has an F number of larger than 1.8, and the optical lens has at least one aspheric lens to correct aberrations. Further, the optical lens may satisfy the following condition:

0.77>f/H>0.6, where f denotes an effective focal length of the optical lens, and H denotes a maximum image height of an image formed by the optical lens at the minified side. Specifically, in case an optical lens is designed to meet a condition of f/H>0.77, it may indicate that the optical lens may obtain better imaging quality but have a smaller field-of-view. Further, in case an optical lens is designed to meet a condition of f/H<0.6, it may indicate that the optical lens may obtain a wider field-of-view but result in larger aberrations. Therefore, when the condition of 0.77>f/H>0.6 is met, a good compromise between a wider field-of-view and better imaging quality for an optical lens is achieved.

Further, in one embodiment, a first lens group of the optical lens may include a first aspheric lens and a second aspheric lens, the first aspheric lens may satisfy a condition of 3.5>RT1>2.5, and the second aspheric lens may satisfy a condition of 3.5>RT2>2.6, where RT1 and RT2 are thickness ratios of the first aspheric lens and the second aspheric lens respectively, the thickness ratio RT1 is defined as a ratio of a maximum axial thickness Tmax to a minimum axial thickness Tmin within a clear aperture CA of the first aspheric lens, and the thickness ratio RT2 is defined as a ratio of a maximum axial thickness Tmax to a minimum axial thickness Tmin within a clear aperture CA of and the second aspheric lens. When the above ranges of thickness ratios are met, distortion aberrations can be well corrected without considerably increasing fabrication complexities of an aspheric lens.

Further, in another embodiment, the optical lens may satisfy the condition of 8>CA/f>5, where CA is a clear aperture of the first aspheric lens, and f is an effective focal length of the optical lens.

In another embodiment, the optical lens may satisfy the condition of $|H/(f*\tan(x))-1|<0.15$ to have lower distortion aberrations, where f denotes an effective focal length of the optical lens, H denotes a maximum image height of an image formed by the optical lens at the minified side and x denotes a maximum half field angle.

In another embodiment, a maximum optical distortion of the optical lens is less than 15%.

According to the above embodiments, the optical lens may achieve a wide field-of-view, low optical distortions, low fabrication costs and good imaging quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical lens, comprising:
a first lens group disposed between a magnified side and a minified side, the first lens group having a negative refractive power and having a first aspheric lens and a second aspheric lens;
a second lens group disposed between the first lens group and the minified side and having a positive refractive power; and
an aperture stop disposed between the first lens group and the second lens group, wherein the optical lens satisfies:
3.5>RT1>2.5;
3.5>RT2>2.6; and
0.77>f/H>0.6, where f is an effective focal length of the optical lens, H is a maximum image height of an image formed by the optical lens at the minified side, RT1 is a ratio of a maximum thickness to a minimum thickness within a clear aperture of the first aspheric lens, RT2 is a ratio of a maximum thickness to a minimum thickness within a clear aperture of the second aspheric lens, and the maximum thickness and the minimum thickness are respectively a maximum value and a minimum value among thickness values measured in the direction of an optical axis of the optical lens.

2. The optical lens as claimed in claim 1, wherein the optical lens comprises, in order from the magnified side to the minified side, the first aspheric lens, the second aspheric lens, a third lens, a fourth lens, a fifth lens and a sixth lens, and refractive powers of the first aspheric lens to the sixth lens are negative, negative, positive, negative, positive, positive.

3. The optical lens as claimed in claim 2, wherein the second aspheric lens is a biconcave lens and the fourth lens is a meniscus lens, or the second aspheric lens is a meniscus lens and the fourth lens is a bi-concave lens.

4. The optical lens as claimed in claim 1, wherein an F number the optical lens is larger than 1.8.

5. The optical lens as claimed in claim 1, wherein a maximum optical distortion of the optical lens is less than 15%.

6. The optical lens as claimed in claim 1, wherein a magnified-side surface of the first aspheric lens comprises a center region overlapping the optical axis and an a periphery region away from the optical axis, and the center region is concave towards the minified side to form at least one inflection point on the border between the center region and the periphery region.

7. An optical lens, comprising:
a first lens group disposed between a magnified side and a minified side, the first lens group having a negative refractive power and having a first aspheric lens and a second aspheric lens;
a second lens group disposed between the first lens group and the minified side and having a positive refractive power; and
an aperture stop disposed between the first lens group and the second lens group, wherein a magnified-side surface of the first aspheric lens comprises a center region overlapping an optical axis and an a periphery region away from the optical axis, the center region is concave towards the minified side to form at least one inflection point on the border between the center region and the periphery region, and the optical lens satisfies:
0<|H/(f*tan(x))−1|<0.15, where f is an effective focal length of the optical lens, H is a maximum image height of an image formed by the optical lens at the minified side, and x is a maximum half field angle.

8. The optical lens as claimed in claim 7, wherein the optical lens comprises, in order from the magnified side to the minified side, the first aspheric lens, the second aspheric lens, a third lens, a fourth lens, a fifth lens and a sixth lens, and refractive powers of the first aspheric lens to the sixth lens are negative, negative, positive, negative, positive, positive.

9. The optical lens as claimed in claim 8, wherein the second aspheric lens is a bi-concave lens and the fourth lens is a meniscus lens, or the second aspheric lens is a meniscus lens and the fourth lens is a bi-concave lens.

10. The optical lens as claimed in claim 7, wherein an F number the optical lens is larger than 1.8.

11. The optical lens as claimed in claim 7, wherein a maximum optical distortion of the optical lens is less than 15%.

12. An optical lens, comprising:
a first lens group disposed between a magnified side and a minified side, the first lens group having a negative refractive power and having a first aspheric lens;
a second lens group disposed between the first lens group and the minified side and having a positive refractive power; and
an aperture stop disposed between the first lens group and the second lens group, wherein the optical lens satisfies:
3.5>RT1>2.5; and
8>CA/f>5, where CA is a clear aperture of the first aspheric lens, RT1 is a ratio of a maximum thickness to a minimum thickness within the clear aperture of the first aspheric lens, the maximum thickness and the minimum thickness are respectively a maximum value and a minimum value among thickness values measured in the direction of an optical axis of the optical lens, and f is an effective focal length of the optical lens.

13. The optical lens as claimed in claim 12, wherein the first lens group further comprises a second aspheric lens disposed on one side of the first aspheric lens.

14. The optical lens as claimed in claim 13, wherein the optical lens comprises, in order from the magnified side to the minified side, the first aspheric lens, the second aspheric lens, a third lens, a fourth lens, a fifth lens and a sixth lens, and refractive powers of the first aspheric lens to the sixth lens are negative, negative, positive, negative, positive, positive.

15. The optical lens as claimed in claim 14, wherein the sixth lens is an aspheric lens.

16. The optical lens as claimed in claim 14, wherein the second aspheric lens is a bi-concave lens and the fourth lens is a meniscus lens, or the second aspheric lens is a meniscus lens and the fourth lens is a bi-concave lens.

17. The optical lens as claimed in claim 12, wherein an F number the optical lens is larger than 1.8.

18. The optical lens as claimed in claim 12, wherein a maximum optical distortion of the optical lens is less than 15%.

19. The optical lens as claimed in claim 12, wherein a magnified-side surface of the first aspheric lens comprises a center region overlapping the optical axis and an a periphery region away from the axis, and the center region is concave towards the minified side to form at least one inflection point on the border between the center region and the periphery region.

* * * * *